UNITED STATES PATENT OFFICE.

IRA M. CHURCH, OF AULD, CALIFORNIA.

REMEDY FOR THE BEE DISEASE CALLED THE EUROPEAN FOUL BROOD.

1,242,770.     Specification of Letters Patent.     Patented Oct. 9, 1917.

No Drawing.     Application filed November 21, 1916. Serial No. 132,567.

*To all whom it may concern:*

Be it known that I, IRA M. CHURCH, a citizen of the United States, residing at Auld, in the county of Riverside and State of California, have invented new and useful Improvements in a Remedy for the Bee Disease Called the European Foul Brood, of which the following is a specification.

My invention relates to a spraying solution used for combating the so-called European foul brood disease of bees.

Considerable damage has recently been done to apiaries in the western part of the United States, and especially along the Pacific Coast by the ravages of a disease known under the name of the European foul brood disease. The exact cause of the disease appears not to be known at the present time, although it is generally believed that it is due to a pathogenic germ. The disease is infectious and is rapidly carried from one colony to another. The symptoms of the disease are as follows: The larvæ are killed by this disease, their death occurring at any time from the time of hatching until the same are capped over. A black stripe along the back of the larvæ is an indication that the disease is present. When the colony is infected, the bees become restless and will stop work and usually die out in the course of six weeks. Bees of neighboring colonies will rob the infected colony of its honey and thus carry the disease to other thus far healthy colonies.

In the long series of my experiments, to combat the above disease, I have discovered a fluid composition, which, when compounded and applied as hereinafter described, will effectually disinfect the colony and kill the germ or in some manner change the physical conditions within the colony, that the disease will not spread any further, or will disinfect or sterilize the contents of the colony so that the disease will not develop. The solution is periodically applied to all the colonies, thereby keeping them in a healthy condition.

My composition is compounded as follows:

Three quarts of cold water.
One-third ounce of common salt.
One-fourth fluid ounce of carbolic acid, solution of commerce.
Three-eighths fluid ounce of hydrogen peroxid.
One-fourth fluid ounce of sulfuric acid.

The ingredients are mixed in the order named, starting with the water first.

In applying the solution, about two tablespoonfuls are placed in an atomizer, the lid of the colony is removed and the central comb section is taken out. If the colony is well filled with honey, it is advisable to take out one of the end sections and replace it with an empty card to allow the bees to crawl into this empty end section during the spraying operation. The composition is sprayed through the atomizer, which should eject the liquid in the form of a dense fog into the central section. The lid is quickly replaced, thus confining the atomized mixture to permeate the entire contents of the colony.

The spraying solution will not injure the honey nor the bees. It is advisable to spray the colonies from time to time, at intervals from two to four weeks, when the disease is known to be in the neighborhood, although the colonies themselves may not show any indications of being infected. It may be remarked that one of the first symptoms indicating that the colony is infected is through the position of the larvæ. If the same lie on their backs or on their under side, the colony is infected.

While the proportions of the ingredients may be varied somewhat, the best results are obtained by adhering to them rather closely.

I claim:

1. A spraying composition of the kind described, consisting of water and a small percentage of each of the following: common salt, carbolic acid, hydrogen peroxid and sulfuric acid, each of said last named ingredients being less than five per cent. by weight of the composition.

2. A spraying composition of the kind described, comprising water, and less than one per cent. of each of the following: common salt, carbolic acid, hydrogen peroxid and sulfuric acid.

3. A spraying composition of the kind described, consisting of three quarts of water, one-third ounce of common salt, one-fourth fluid ounce of carbolic acid, three-eighths fluid ounce of hydrogen peroxid, and one-fourth fluid ounce sulfuric acid.

In testimony whereof I have signed my name to this specification.

IRA M. CHURCH.